(12) United States Patent
Pollard et al.

(10) Patent No.: US 7,941,978 B1
(45) Date of Patent: May 17, 2011

(54) DEPLOYABLE HEIRARCHICAL STRUCTURE

(75) Inventors: Eric L. Pollard, Albuquerque, NM (US);
Thomas W. Murphey, Albuquerque, NM (US)

(73) Assignee: The United States of America as represented by the Secretary of the Air Force, Arlington, VA (US)

( * ) Notice: Subject to any disclaimer, the term of this patent is extended or adjusted under 35 U.S.C. 154(b) by 0 days.

(21) Appl. No.: 12/644,121

(22) Filed: Dec. 22, 2009

Related U.S. Application Data

(63) Continuation of application No. 11/463,831, filed on Aug. 10, 2006, now abandoned.

(51) Int. Cl.
*E04H 12/18* (2006.01)
*H01Q 1/08* (2006.01)

(52) U.S. Cl. ............... 52/108; 52/109; 52/645; 343/881

(58) Field of Classification Search ............ 52/108–110, 52/645, 646, 648.1; 343/915, 880–883
See application file for complete search history.

(56) References Cited

U.S. PATENT DOCUMENTS

| | | | | |
|---|---|---|---|---|
| 3,830,031 A * | 8/1974 | Soisson | ............ | 52/645 |
| 4,400,926 A * | 8/1983 | Tuggle | ............ | 52/646 |
| 4,482,900 A * | 11/1984 | Bilek et al. | ............ | 343/915 |
| 4,569,176 A * | 2/1986 | Hedgepeth et al. | ............ | 52/645 |
| 4,599,832 A * | 7/1986 | Benton et al. | ............ | 52/118 |
| 4,655,022 A * | 4/1987 | Natori | ............ | 52/646 |
| 4,667,451 A * | 5/1987 | Onoda | ............ | 52/646 |
| 4,722,162 A * | 2/1988 | Wilensky | ............ | 52/652.1 |
| 4,745,725 A * | 5/1988 | Onoda | ............ | 52/646 |
| 4,958,474 A * | 9/1990 | Adams | ............ | 52/646 |
| 5,085,018 A * | 2/1992 | Kitamura et al. | ............ | 52/108 |
| 5,163,262 A * | 11/1992 | Adams | ............ | 52/646 |
| 5,184,444 A * | 2/1993 | Warden | ............ | 52/646 |
| 5,845,451 A * | 12/1998 | Tolentino | ............ | 52/646 |
| 6,904,722 B2 * | 6/2005 | Brown et al. | ............ | 52/121 |
| 6,910,304 B2 * | 6/2005 | Warren | ............ | 52/108 |
| 6,920,722 B2 * | 7/2005 | Brown et al. | ............ | 52/108 |
| 2001/0005967 A1 * | 7/2001 | Meguro et al. | ............ | 52/653.1 |

\* cited by examiner

*Primary Examiner* — Khoi Tran
*Assistant Examiner* — Jason Holloway
(74) *Attorney, Agent, or Firm* — Kenneth E. Callahan

(57) ABSTRACT

A collapsible and deployable hierarchical open lattice assembly comprised of hinge boxes of 12 battens connected by hinge nodes. The hinge nodes are made of a plurality of resilient flexure joints, each joint connected to a batten and giving said batten a 90-degree in-plane rotation capability with a neutral-shaped flexure in a deployed state and a deformed-shaped flexure in a compressed state, whereby a restorative moment is created tending to return said flexure to its neutral state. One or more trusses are formed by sets of four longerons connected to the hinge boxes by the resilient flexure joints. Multiple hub boxes connected by longerons may be used to create a hierarchical truss of trusses in either two or three dimensions. These assemblies may be collapsed to a linear dimension by shearing the hub boxes and trusses in a parallelogram manner. The folding kinematics occur in three stages, which may be performed either sequentially or simultaneously. Initially the trusses connecting the hub boxes are sheared. Then the hub boxes and trusses are sheared in one common dimension to reduce the assembly to a two-dimensional, planar configuration. Finally the hub boxes and trusses are sheared in a perpendicular common dimension to reduce the assembly to a one-dimensional, linear configuration.

2 Claims, 11 Drawing Sheets

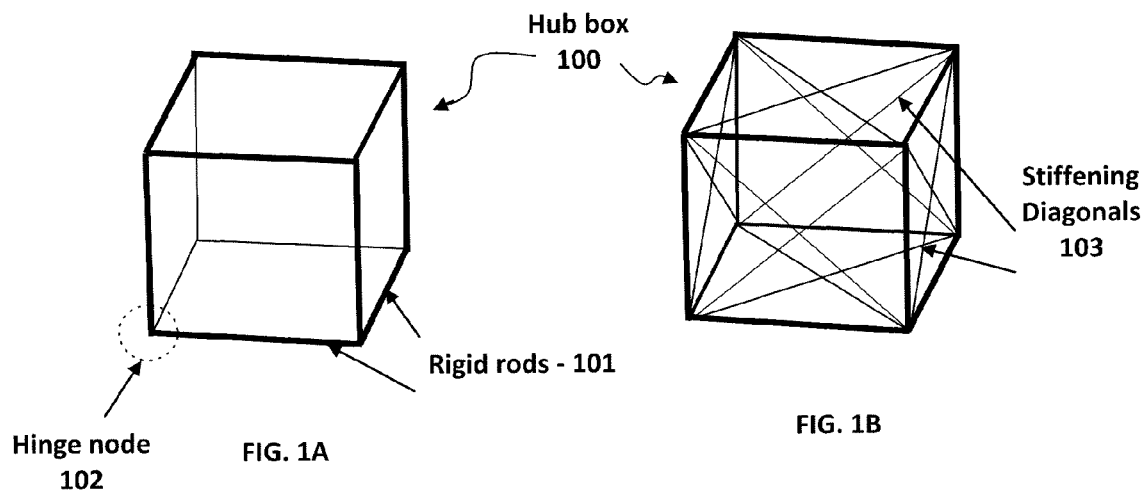
FIG. 1A
FIG. 1B
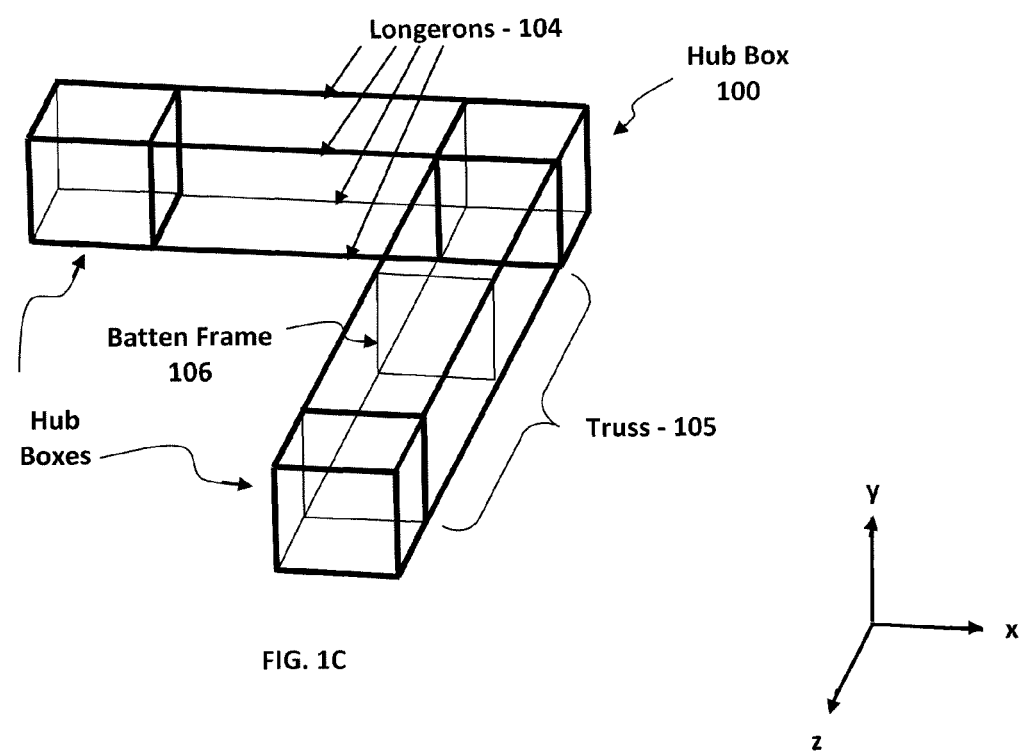
FIG. 1C

Cross-section of a Hinge Node

Hinge Node Compressed

Cross-section of a Hinge Node
in a Compressed Configuration

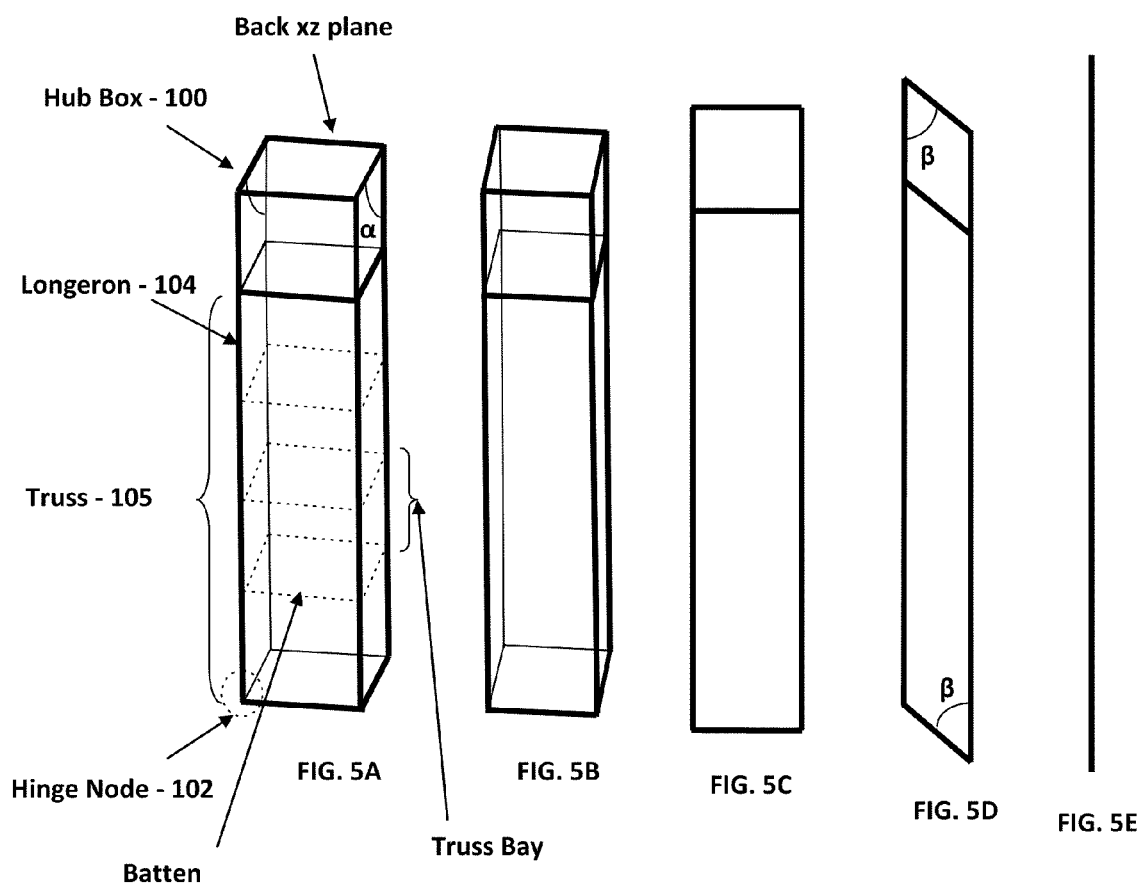

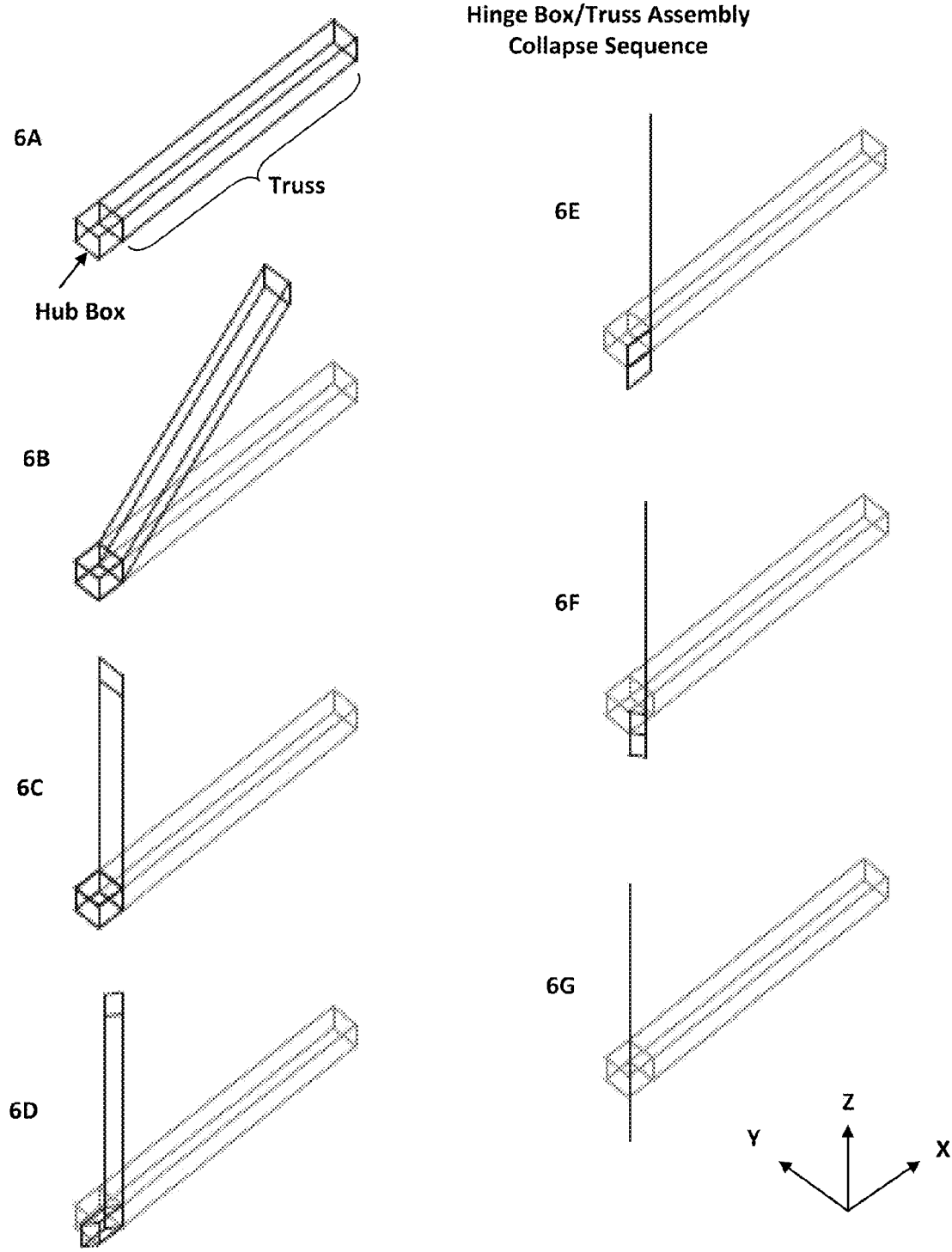

3-Hub Box/2-Truss Assembly
Collapse Sequence

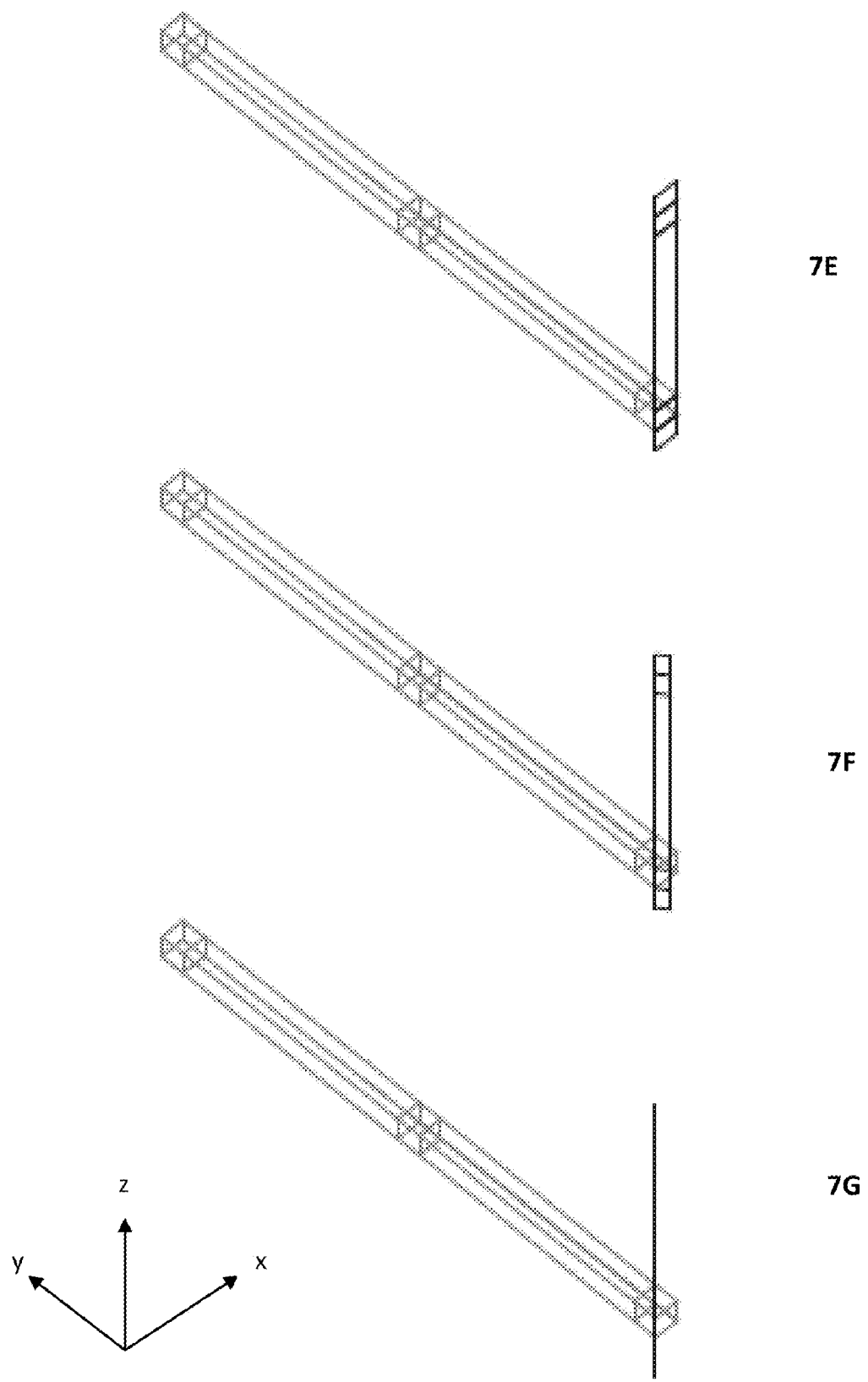
FIG. 7E-G

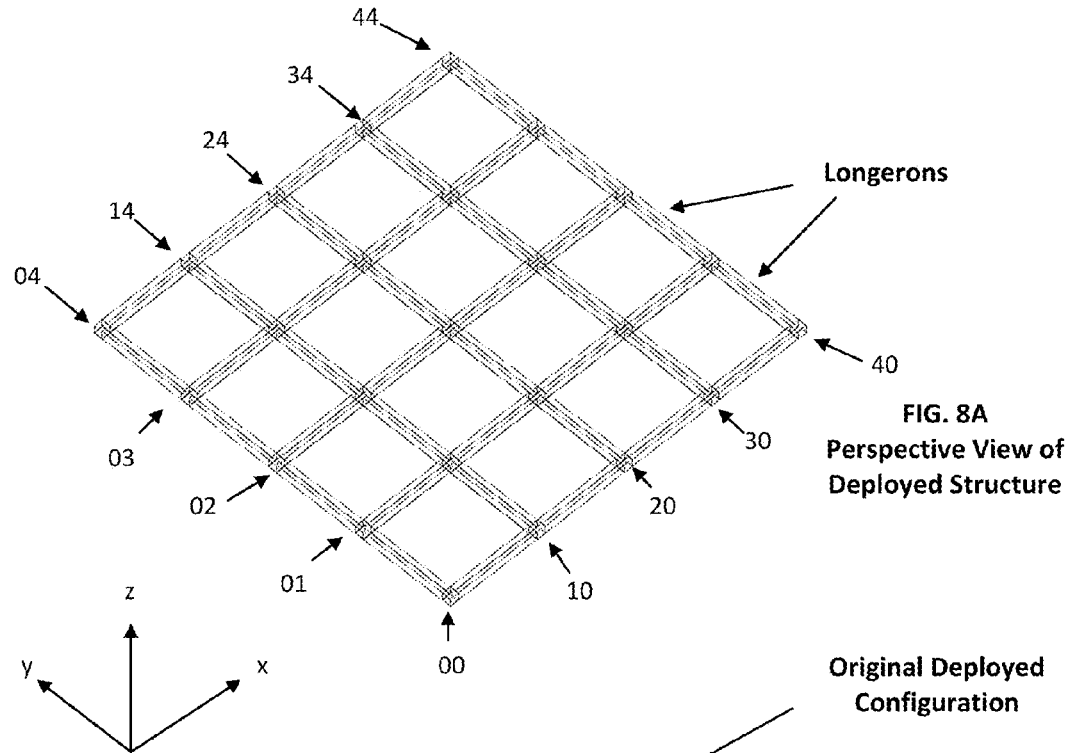
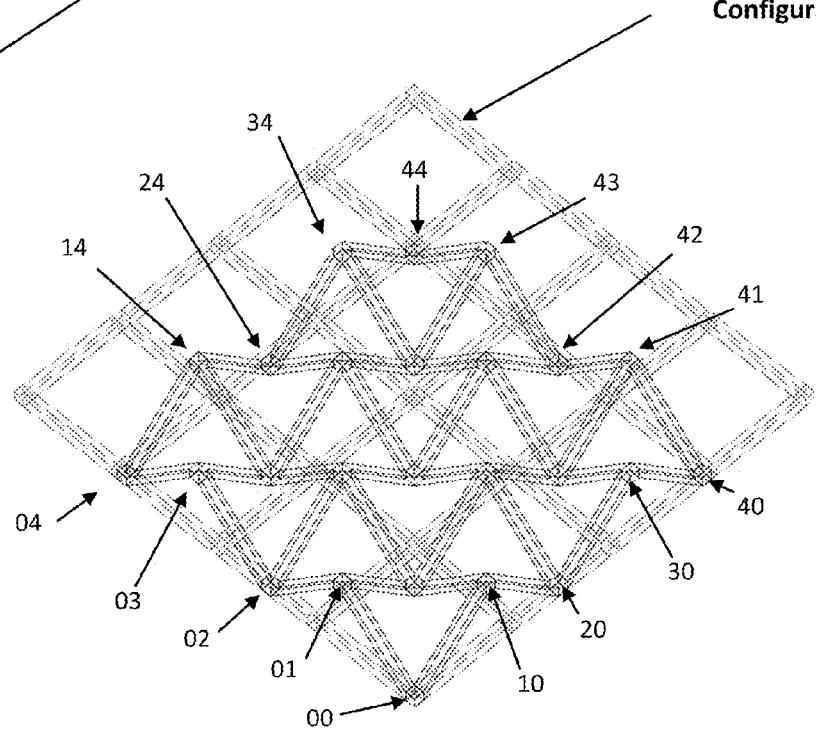
FIG. 8A-8B
Two-dimensional Deployed Hierarchical Structure
Deployed to Collapsed Configuration in 7 Steps
FIG. 8A
Perspective View of
Deployed Structure
FIG. 8B
Intermediate State
Of Collapse
Original Deployed Configuration
Longerons 90 Deg. Rotations Intermediate
Rotations in
YZ Plane 90 Deg. Rotations
In YZ Plane Rotations in XY Plane 90 Degree Rotation
In YZ Plane Truss of Trusses ial
DEPLOYABLE HEIRARCHICAL STRUCTURE This application is a continuation in part of application Ser. No. 11/463,831 filed on Aug. 10, 2006.

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights. This is a continuation-in-part of application Ser. No. 11/463,831 filed Aug. 10, 2006.

BACKGROUND OF THE INVENTION

The present invention is related to a collapsible and deployable structure, and would be particularly useful for platforms that require hierarchy to achieve rigidity and strength requirements. More particularly, the present invention is a structure that can be collapsed from its deployed configuration into a linear configuration for storage or transportation.

It is often necessary to transport a structure that occupies considerable volume. Where a launch vehicle is being used to transport the structure, the problem of storage becomes acute because vehicles adapted for lifting a load from the earth's surface require a streamlined shape due to aerodynamic considerations. For example, unmanned launch vehicles ordinarily carry their payload in a fairing or tapered nose cone. Ordinarily, spacecraft structures such as antennas, sensing instruments and probes, and solar panels are collapsed to dimensions that will fit within the limited storage envelope of the launch vehicle, and are then unfurled or extended in space. It is thus a farther requirement that the collapsed structure be deployed without undue difficulty.

Structural hierarchy is the characteristic of a structure having similar geometry at decreasing length scales. For example, a truss where each strut is also a truss is known as a hierarchical structure. Structural hierarchy is desired because it reduces the material volume needed to achieve strength and stiffness requirements. In deployable structures, hierarchy also leads to more compact packaging because less material needs to be packaged.

The prior art has reduced the volume of collapsed structures by incorporating structural hierarchy in one dimension; however, the benefits of using structural hierarchy to collapse a deployable structure in two or all three dimensions has not been realized. There is a need in the art for a deployable structure that incorporates structural hierarchy to collapse in multiple dimensions, and thus realizes both the greater rigidity and stability per unit of cross-section area while in the deployed configuration, as well as the reduced volume in the collapsed configuration. The present invention fulfills this need in the art.

SUMMARY OF THE INVENTION

The present invention is an open lattice assembly comprised of hub boxes formed from rigid rods connected by hinged nodes, with the hub boxes being connected to each other by longerons. Multiple hub boxes are connected by longerons to create a hierarchical truss of trusses in either two or three dimensions. Truss bays are formed by battens transversely connecting the longerons. The hub boxes and trusses may include stiffening diagonal members across their respective faces.

The deployed assembly is collapsed by shearing the hub boxes and trusses in a parallelogram manner. The folding kinematics occur in three stages, which may be performed either sequentially or simultaneously: (1) the trusses connecting the hub boxes are sheared; (2) the hub boxes and trusses are sheared in one common dimension to reduce the assembly to a two-dimensional, planar configuration; and (3) the hub boxes and trusses are sheared in a perpendicular common dimension to reduce the assembly to a one-dimensional, linear configuration.

Other aspects and advantages of the present invention will become apparent from the following detailed description, taken in conjunction with the accompanying drawings, and illustrating by way of example the principles of the invention.

BRIEF DESCRIPTION OF THE DRAWINGS

FIG. 1 shows the basic building blocks used to build open lattice assemblies per the present invention. These building blocks include a hub box (1A), a hub box with stiffening diagonals (1B), and a two-dimensional truss assembly (1C).

FIGS. 5A-E shows a sequence for collapsing a single hub box/truss assembly from a 3-D deployed configuration (5A) to a 2-D configuration (5C) and finally to an essentially linear 1-D fully collapsed configuration (5E).

FIG. 6 shows a detailed collapse sequence for a single hub box/truss assembly in seven steps (FIGS. 6A-6G) using a different kinematics fold sequence.

FIGS. 7A-G shows a collapse sequence for a 3-hub box/2-truss assembly.

DETAILED DESCRIPTION

Figure 2:
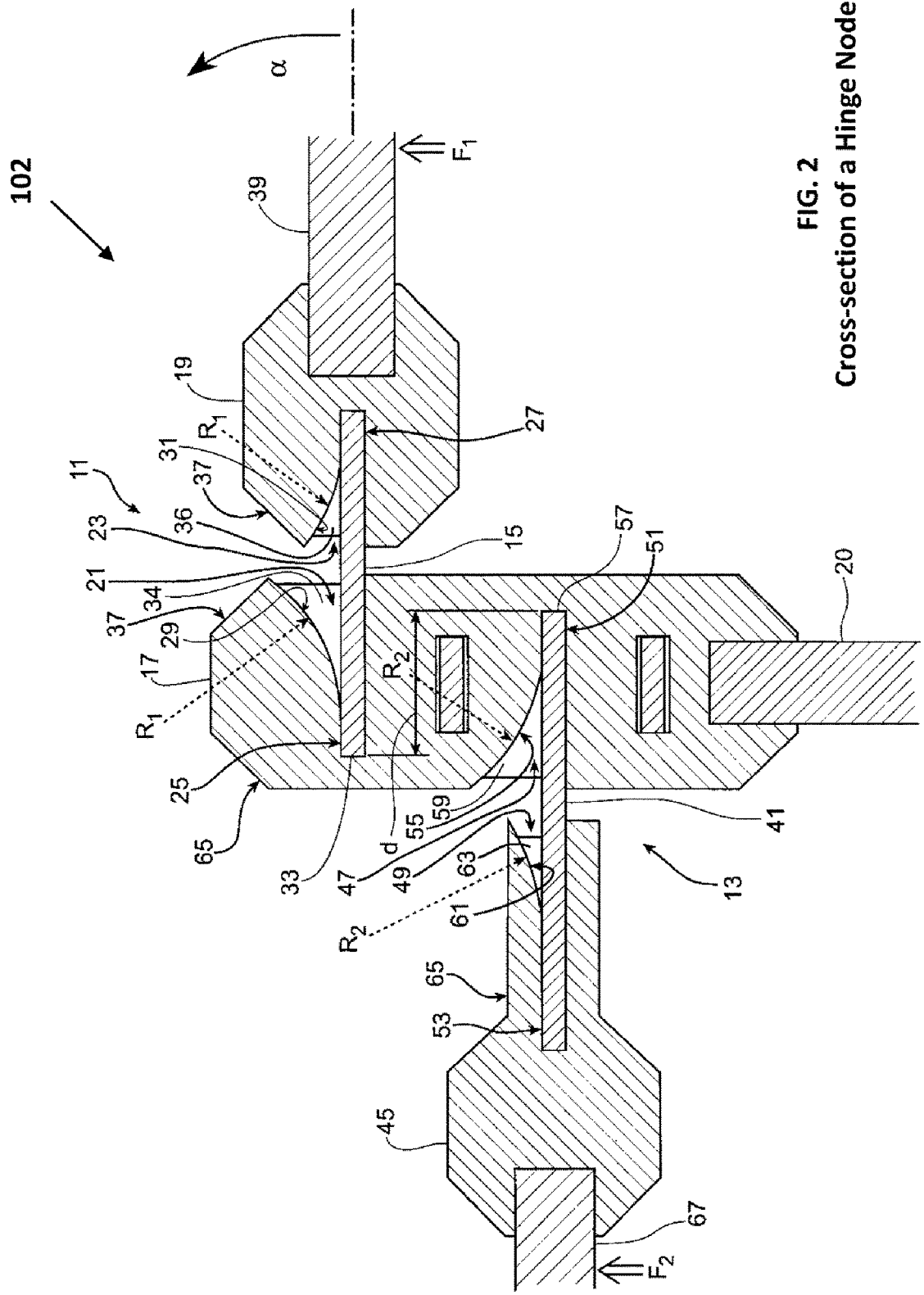
FIG. 2 shows a detailed cross-section of a hinge node in its deployed configuration.

FIG. 1 shows the basic building blocks used to build open lattice assemblies that can be collapsed or deployed. FIG. 1A is a hub box 100 formed from 12 rigid rods 101 connected at 8 hinge nodes 102. FIG. 1B shows a hub box stiffened by flexible diagonals 103, such as cables. Subsequent diagrams will not include these diagonals to simplify the diagrams. FIG. 1C shows three hub boxes connected by longerons 104 to form an assembly of two trusses 105 connected at right angles. Four longerons connecting two hub boxes define a truss. All planes may have diagonals in a hub. The outer surfaces only may have diagonals in the trusses. Battens are elements that connect and run transverse to longerons. Batten frames 106 without diagonals may be included within trusses for additional stiffening.

Figure 4:
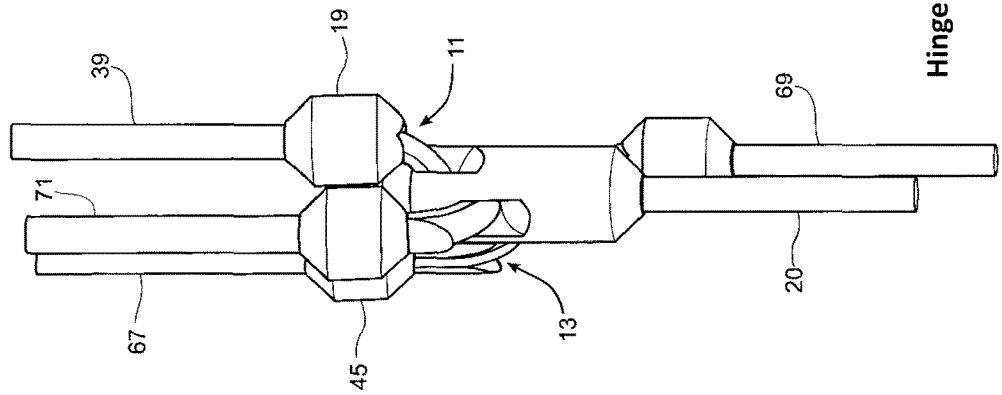
FIG. 4 is a perspective drawing of a hinge node in a compressed configuration.
Figure 3:
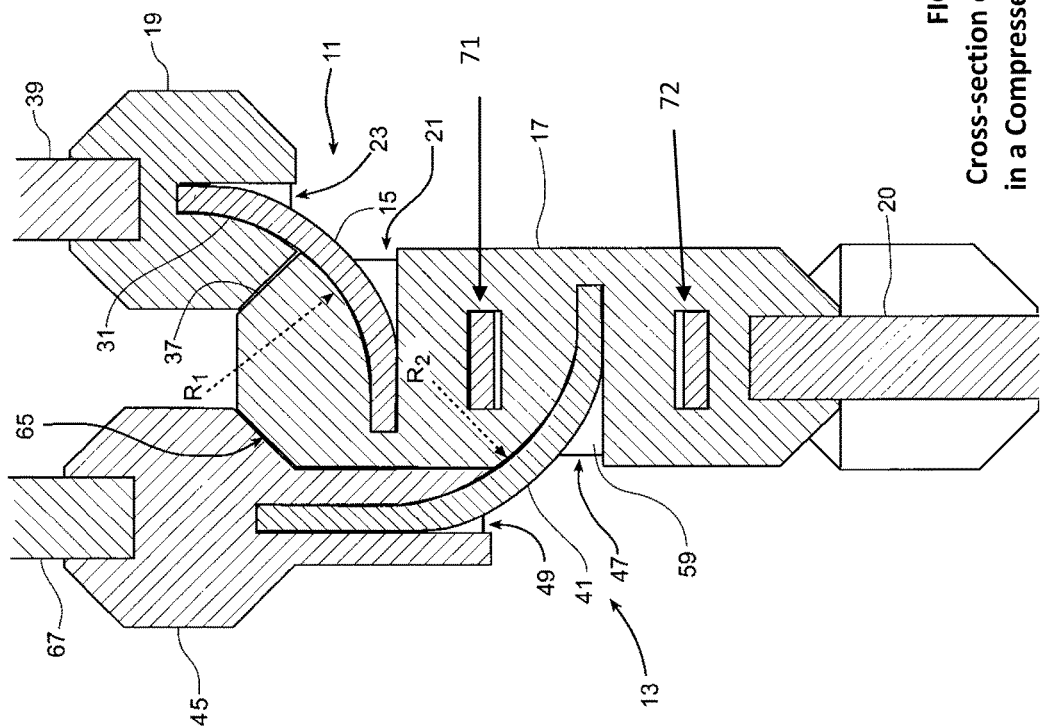
FIG. 3 shows a cross-section of a hinge node in a compressed configuration.

FIG. 2 is a cross-sectional diagram showing details of a hinge node 102. This is FIG. 1 of U.S. Pat. No. 7,435,032 by the same inventors. This patent defines a resilient joint for deployable structures that is the preferred connecting device that may be employed in the hinge nodes 102 and is hereby incorporated by reference. Two nested joints are shown 19, 45 with the joints unbent and the respective attached rigid rods 39, 67 in their deployed configuration. A joint 11 is comprised of a flexure 15, a structural node or hub 17, and a structural connector 19 to which a rigid rod 39 is attached. When force is applied F1, F2 the rods may be rotated 90 degrees ($\alpha$=90° in a plane as shown in FIG. 3. This is the compressed or folded configuration. The flexures 15, 41 are comprised of a resilient material and have one end attached to a cavity 21, 47 in the hub 17 and the other end attached to structural connectors 19, 45. The shape of the hub, the cavities, and the structural connectors only permit rotation through 90 degrees within a fixed plane. Two additional joints are indicated by their flexures 71, 72 having a freedom of rotation in a plane perpendicular to the plane of the paper. FIG. 4 is a perspective view of a hinge node in a collapsed configuration but with cavities permitting ±90 degrees rotations. For the present invention, only hinge nodes restricted to 90 degree rotations in predetermined directions are required. The "resilient flexure joint" of U.S. Pat. No. 7,435,032 or one having similar characteristics is here defined as the type of connecting joint used in the hinge nodes 102. These characteristics include a 90 degree in-plane rotation capability with a neutral-shaped flexure in its deployed state and a deformed-shaped flexure in its compressed state which creates a restorative moment tending to return the flexure to its neutral shape for each connected batten 101.

FIG. 5 illustrates how a three-dimensional (3-D) deployed truss assembly (5A) may be collapsed to an essentially one-dimensional object (5E) by 90-degree rotations in two different planes using the resilient flexure joint rod connectors. As a generalization, a deployed assembly is collapsed by shearing the hub boxes and trusses in a parallelogram manner. The folding kinematics occurs in stages, which may be performed either sequentially or simultaneously. When sequencing, the order of operations can be changed. For example, the $\beta$ shearing can occur first and the a shearing second. In FIG. 5 the hub boxes and trusses are sheared in one common dimension to reduce the assembly to a two-dimensional, planar configuration (angle $\alpha$ in 5A-C). Then the hub boxes and trusses are sheared in a perpendicular common dimension (angle $\beta$ in 5C-E) to reduce the assembly to a one-dimensional, linear configuration (5E).

In this FIG. 5 example, the $\alpha$-angles in the yz-plane between the rods connected to the back xz-plane go from 90° to zero in the first rotation. FIGS. 5B to 5C shows this rotation at successive stages ending in the two-dimensional (2-D) structure of FIG. 5C lying in the back xy-plane. In the next rotation the $\beta$-angles in the xz plane go from 90° to zero starting in FIG. 5D and ending in a one-dimensional (1D) line (disregarding the actual dimensions of the rods and hinges) in FIG. 5E. Deployment would reverse the sequence with compression strain built up by the collapse sequence being sufficient to deploy the assembly without external force.

FIG. 6 is a different collapse sequence of the FIG. 5 assembly shown from a different perspective. FIG. 6A is the deployed assembly. The light lines in the subsequent six steps continue to show the original deployed configuration (6A) in each step. The next six figures (FIGS. 6B-6G) show the collapse sequence to ultimately obtain the one-dimensional, linear fully compressed configuration. Again, as a generalization, the deployed assembly is collapsed by shearing the hub boxes and trusses in a parallelogram manner. The trusses connecting the hub boxes are sheared (6A-C). Then the hub boxes and trusses are sheared in one common dimension to reduce the assembly to a two-dimensional, planar configuration (6D-E). Finally the hub boxes and trusses are sheared in a perpendicular common dimension to reduce the assembly to a one-dimensional, linear configuration (6F-G).

Referring to FIG. 6, 6B through 6C shows the truss rotating through 90 degrees (angle $\alpha$ in the xz plane rotates through 90°) while the hub box retains its configuration. Next the 2-dimensional truss is rotated to a linear configuration (angle $\beta$ in the yz plane rotates through 90°) while the hub box simultaneously collapses to a 2-D form in FIGS. 6D to 6E. Finally, the 2-D hub box is rotated to a linear configuration parallel and adjacent to the linear truss (hub box angle $\gamma$ in the xz plane rotates through 90°) in FIG. 6F-6G. The angles $\alpha$, $\beta$, and $\gamma$ are not shown in the diagram.

Figures 7A, 7B, 7C, 7D:
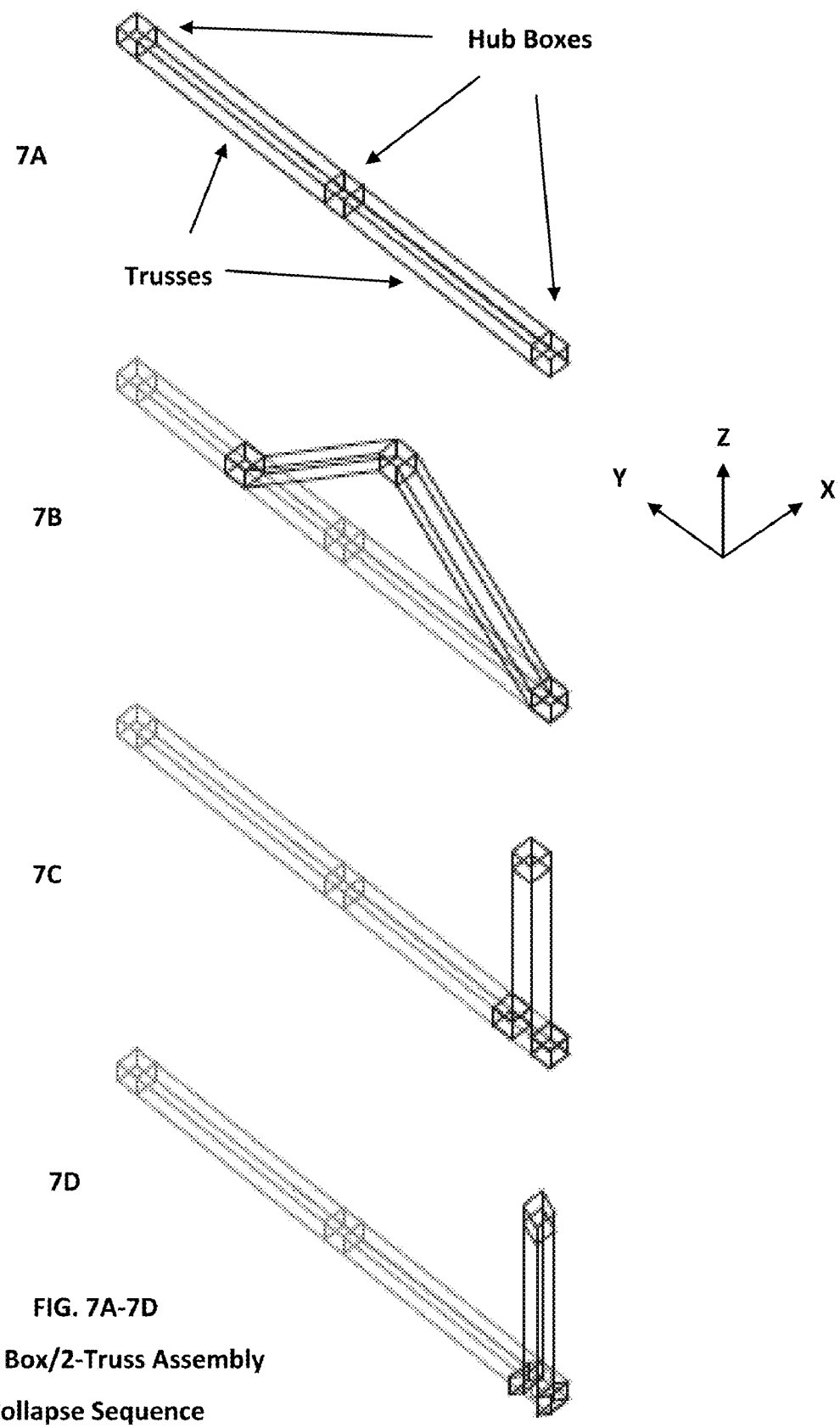

FIG. 7A shows a 3 hub box/2 truss assembly extending along the y-axis. The y-axis is collapsed in 7B-C by 90 degree rotations in the yz plane of the trusses relative to the hub boxes. Next the hub boxes are collapsed by 90 degree rotations in the yz plane (7D-E) to obtain a 2-D configuration. Finally, this 2-D figure is sheared in the xz plane to a linear dimension.

Figure 8C:
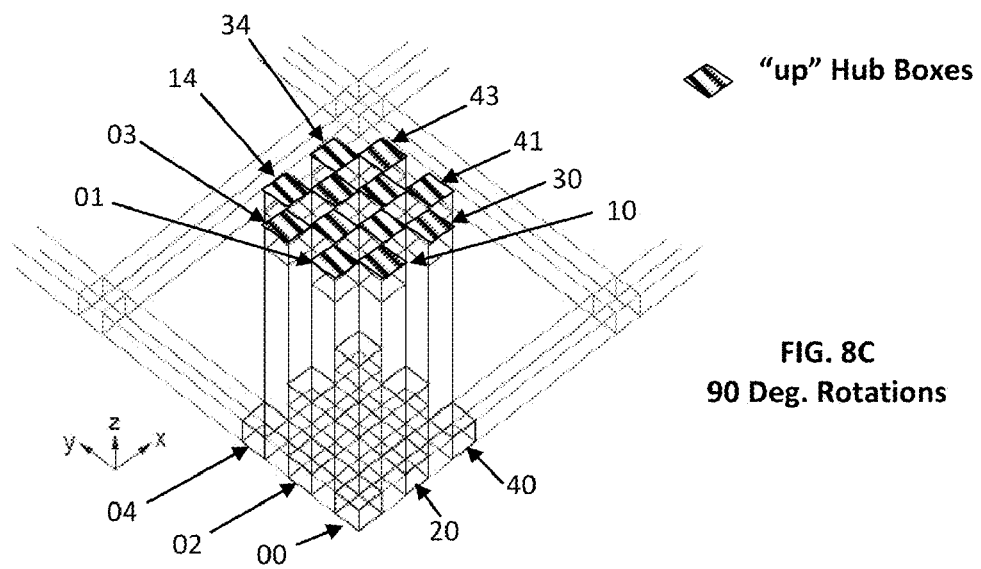
FIG. 8 is a 2-dimensional deployed hierarchical structure comprised of hub boxes and longerons that can be collapsed to a linear structure (8A through 8G) in a sequence of 90 degree rotations.

FIG. 8A shows a assembly made up of a series of truss/hub box components forming a 2-D hierarchical structure. Individual hub boxes have been identified by an (xy) matrix notation. This structure may be collapsed into a linear dimension by the sequence shown in FIGS. 8B through 8G. The original structure configuration is shown lightly throughout the sequence. Initially, alternate hub boxes are raised as shown in FIG. 8B until the longerons are parallel to each other and perpendicular to the xy plane as in FIG. 8C. The longerons of each truss are rotated either +90° or –90° with respect to their hub boxes in either the xz or yz planes to achieve this configuration.

Figure 8D:
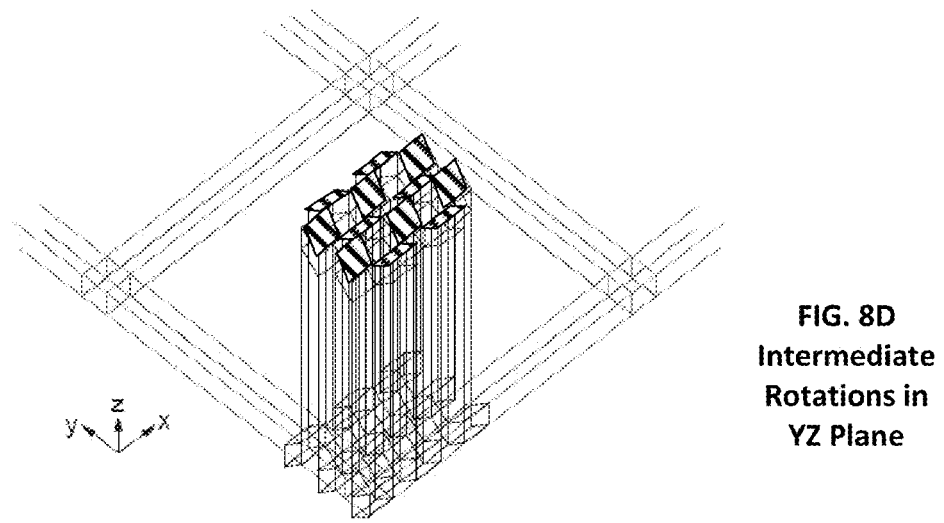
Figure 8E:
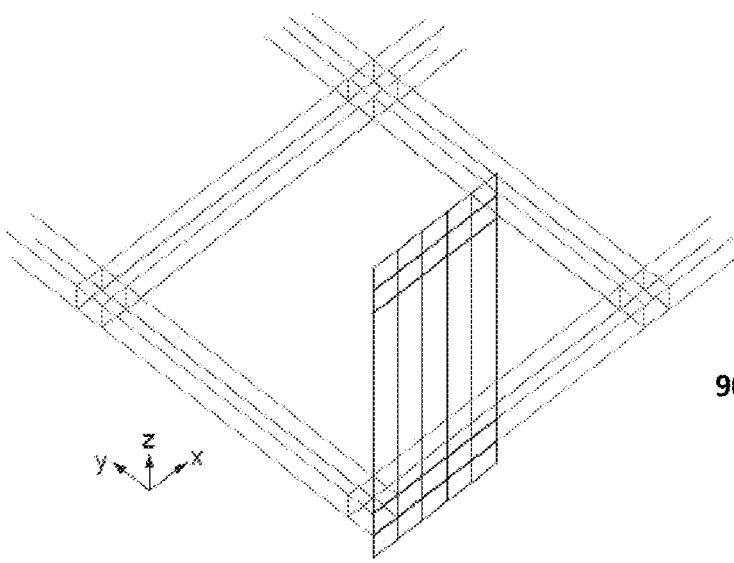
Figure 8F:
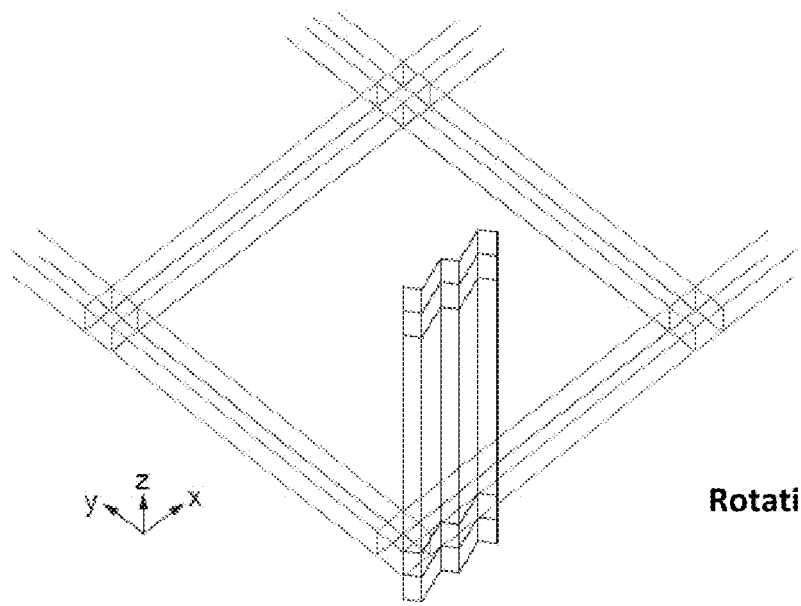
Figure 8G:
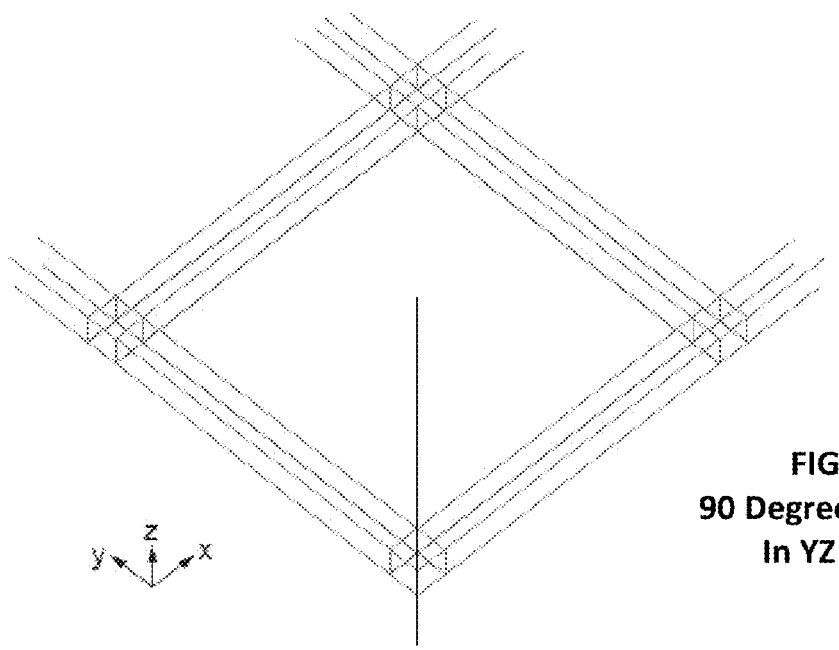
Figure 9:
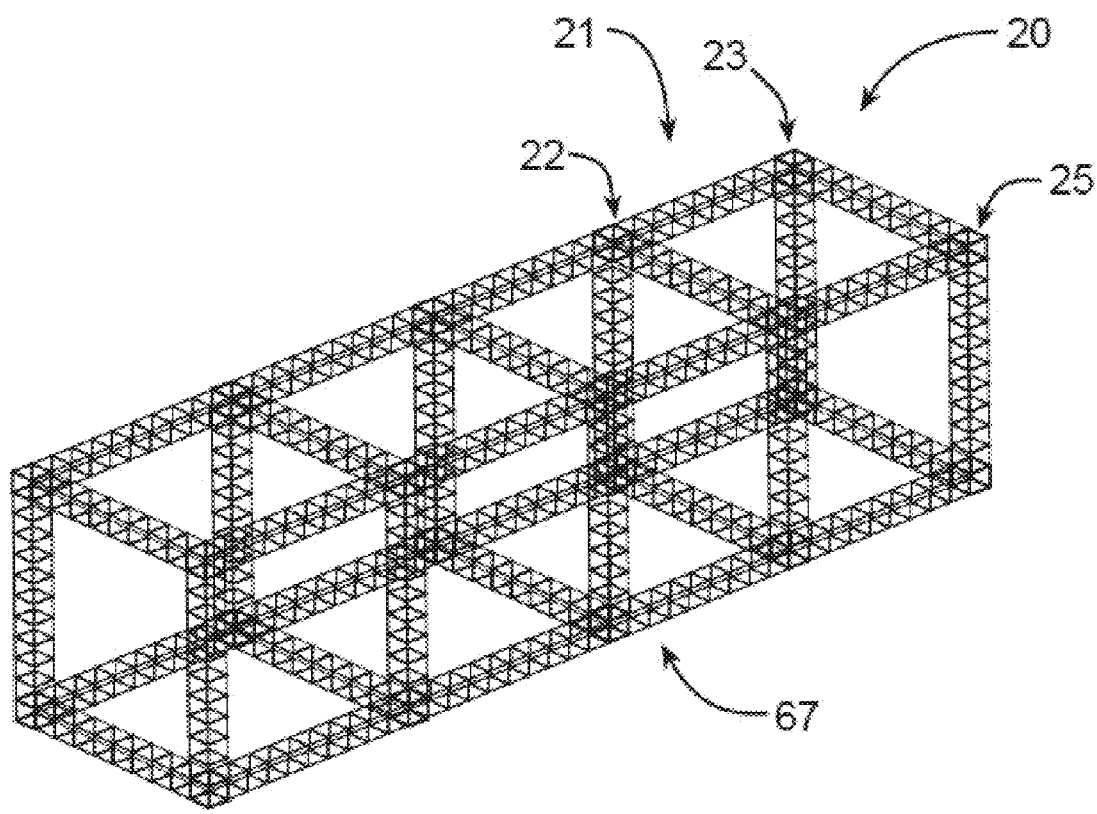
FIG. 9 is a perspective view of a 3-dimensional hierarchical structure, a truss of trusses.

The next 90° rotations in the yz plane, shown in FIGS. 8D and 8E, involves the collapse of the hub boxes and the trusses to obtain a planar FIG. 8E) lying in the xz plane. Then alternate ±90 degree rotations in the xz plane results in a linear configuration similar to FIG. 5E. The final 90 degree rotation in the xz plane results in a linear dimension (8G).

FIG. 13 illustrates a deployed 3-dimensional hierarchical structure. It is a truss of trusses, being comprised of hub boxes and trusses as previously described. The collapse of this structure into a linear structure follows the same principles as discussed above.

Thus, a deployable hierarchical structure comprised of hub boxes connected by trusses with resilient flexure joints as taught in U.S. Pat. No. 7,435,032 at the hub nodes can be constructed. The deployed assembly is collapsed by shearing the hub boxes and trusses in a parallelogram manner. The folding kinematics may occur in three stages, which may be performed either sequentially or simultaneously. First the trusses connecting the hub boxes are sheared by 90 degrees. Next the hub boxes and trusses are sheared in one common dimension to reduce the assembly to a two-dimensional, planar configuration. Finally the hub boxes and trusses are sheared in a perpendicular common dimension to reduce the assembly to a one-dimensional, linear configuration.

The invention claimed is:

1. A collapsible and deployable hierarchical open lattice assembly comprised of a plurality of cube-shaped hub boxes and trusses connecting two or more hub boxes together, said assembly comprised of:
   a. a plurality of cube-shaped hub boxes;
      1) each hub box comprised of a hinge node located at each corner of said hub box with straight and rigid rods connecting said hinge nodes so as to form a cube-shaped box with 3 rods extending from each hinge node at 90-degree angles from each other;

2) each hinge node comprised of a structural node and 3 or more resilient joints, each resilient joint comprised of;

(a) a flexure comprised of a resilient material;

(b) said flexure being attached to said structural node at one end and to a rigid rod at the opposite end;

(c) said flexure having a neutral shape with a restorative moment being created in the flexure when the flexure is deformed from the neutral shape and with the restorative moment tending to return the flexure to the neutral shape;

(d) the neutral shape of said flexures being the deployed state in which the attached rods form a cube-shaped hub box;

(e) each resilient joint being capable only of rotating 90 degrees in a single plane; and b. one or more trusses connecting two or more hub boxes, said trusses comprised of four straight and rigid longerons connecting four hinge nodes of a first hub box by said resilient joints to four hinge nodes of a second hub box by said resilient joints with the neutral shape of the flexures of the trusses' resilient joints being the deployed state, whereby multiple hub boxes connected by longerons may create a hierarchical truss of trusses in either two or three dimensions that can be collapsed first into two dimensions and then into a single dimension.

2. The open lattice assembly of claim 1, wherein said hub boxes are stiffened by flexible diagonal cables.

\* \* \* \* \*